United States Patent
Bartnick

(10) Patent No.: US 8,418,828 B2
(45) Date of Patent: Apr. 16, 2013

(54) UNPOWERED PEDAL ASSIST DEVICE AND VEHICULAR CLUTCH ASSEMBLY INCLUDING THE SAME

(75) Inventor: Brian K. Bartnick, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 463 days.

(21) Appl. No.: 12/763,823

(22) Filed: Apr. 20, 2010

(65) Prior Publication Data

US 2011/0252918 A1  Oct. 20, 2011

(51) Int. Cl.
*F16D 23/12* (2006.01)
*G05G 1/30* (2008.04)

(52) U.S. Cl.
USPC ............... 192/99 S; 74/512; 74/518; 74/519

(58) Field of Classification Search ......... 192/99 S, 192/101
See application file for complete search history.

(56) References Cited

U.S. PATENT DOCUMENTS

| | | | |
|---|---|---|---|
| 1,810,103 A | 6/1931 | Flagstad | |
| 2,882,744 A | 4/1959 | Keller | |
| 3,199,366 A * | 8/1965 | Herrington, Jr. | 74/512 |
| 3,302,763 A | 2/1967 | Wobrock | |
| 3,381,786 A | 5/1968 | Gatewood | |
| 3,858,457 A | 1/1975 | Mathues | |
| 4,319,497 A * | 3/1982 | Shinto et al. | 74/512 |
| 4,372,178 A | 2/1983 | Ota | |
| 4,522,082 A | 6/1985 | Musumiya et al. | |
| 4,624,152 A * | 11/1986 | Stotz et al. | 74/518 |
| 4,846,012 A | 7/1989 | Papenhagen et al. | |
| 4,987,983 A | 1/1991 | Adams | |
| 5,165,299 A | 11/1992 | Mizuma et al. | |
| 6,679,366 B2 * | 1/2004 | Tulaczko et al. | 192/99 S |
| 6,837,356 B2 * | 1/2005 | Tulaczko et al. | 192/99 S |
| 6,840,132 B2 | 1/2005 | Gohrbandt et al. | |
| 7,228,758 B2 * | 6/2007 | Fujiwara | 74/512 |
| 7,428,856 B2 | 9/2008 | Podkopayev | |
| 7,631,741 B2 | 12/2009 | Swanson | |

FOREIGN PATENT DOCUMENTS

| | | |
|---|---|---|
| EP | 0169138 A2 | 1/1986 |
| EP | 1521004 A1 | 4/2005 |
| FR | 2886421 A1 | 12/2006 |
| GB | 1423605 A | 2/1976 |
| NL | 7605463 A | 11/1976 |

* cited by examiner

*Primary Examiner* — David D Le
*Assistant Examiner* — Jacob S Scott
(74) *Attorney, Agent, or Firm* — Ingrassia Fisher & Lorenz, P.C.

(57) ABSTRACT

Embodiments of an unpowered pedal assist device are provided for use in conjunction with a vehicular control pedal movable between a non-depressed position and a depressed position. In one embodiment, the unpowered pedal assist device includes a multi-bar linkage and at least one resilient element coupled to the multi-bar linkage. The multi-bar linkage is configured to be coupled to the vehicular control pedal and, when so coupled to move from a start position to a finish position as the vehicular control pedal moves from the non-depressed position to the depressed position. The at least one resilient element is configured to bias the multi-bar linkage: (i) toward the start position over an initial range of travel of the vehicular control pedal, and (ii) toward the finish position over a primary range of travel of the vehicular control pedal.

17 Claims, 4 Drawing Sheets

UNPOWERED PEDAL ASSIST DEVICE AND VEHICULAR CLUTCH ASSEMBLY INCLUDING THE SAME

TECHNICAL FIELD

The following disclosure relates generally to vehicular clutch assemblies and, more particularly, to embodiments of an unpowered pedal assist device suitable for use in conjunction with a clutch assembly or other vehicular control pedal assembly.

BACKGROUND

Vehicular clutch assemblies are well-known devices for selectively disengaging an automatic or manual transmission from a vehicle's internal combustion engine during operation of the engine. One of the most common types of vehicular clutch assemblies includes a clutch disc, a pressure plate, a diaphragm spring (also referred to as a "plate spring"), and a thrust bearing (also referred to as a "throw-out bearing"). The clutch disc, pressure plate, and diaphragm spring are slidably mounted around the transmission input shaft and rotate in conjunction therewith. The thrust bearing is also slidably mounted around the transmission input shaft, but generally remains stationary as the input shaft rotates. The clutch assembly normally resides in an engaged position wherein the clutch disc frictionally engages a flywheel driven by the engine resulting in rotation of the clutch disc, pressure plate, diaphragm spring, and the transmission input shaft. To disengage the clutch assembly, the thrust bearing is pressed against the diaphragm spring, which urges the pressure plate and the clutch disc to move away from, and therefore frictionally disengage from, the engine-driven flywheel. When the clutch assembly is moved into the disengaged position, the rotation of the clutch disc, the pressure plate, the diaphragm spring, and the transmission input shaft is slowed or halted to facilitate transmission gear changes. In the case of a manual transmission, disengagement of the clutch assembly is typically controlled by a driver-actuated clutch pedal, which is mechanically linked to the thrust bearing by one or more intervening structures (e.g., a clutch lever and/or a hydraulic system).

The phrase "clutch pedal apply force" is commonly utilized to describe the force that a driver must apply to depress the clutch pedal. The clutch pedal apply force varies over the clutch pedal's range of travel and typically peaks near disengagement of the clutch assembly. For many drivers, such as those with arthritic knees, utilizing a clutch pedal that requires relatively high clutch pedal apply forces can be uncomfortable. Driver discomfort is especially problematic in high horsepower platforms wherein the peak apply force tends to be relatively high (e.g., approaching or exceeding approximately 130 Newton). A limited number of powered and unpowered pedal assist devices have been implemented in some vehicles (e.g., semi-trailer trucks) to lower the driver-required apply force over a portion or over the entirety of the clutch pedal's range of travel. However, in the case of powered pedal assist devices, such assist devices tend to be relatively complex, costly to implement, and often exhibit a noticeable lag between driver actuation of the clutch pedal and the generation of the assist force. Furthermore, in the case of certain proposed unpowered pedal assist devices, the assist device may bias the clutch pedal toward the depressed position over the pedal's initial range of travel, which may result in undesirable wear between clutch assembly components (e.g., the thrust bearing and the spinning diaphragm spring). Finally, in the case of both powered and conventional unpowered pedal assist devices, such devices are often incorporated directly into the clutch assembly (e.g., integrally formed as part of the clutch pedal lever) and are consequently impractical to retrofit to an existing clutch assembly.

There thus exists an ongoing need to provide embodiments of an unpowered pedal assist device for use in conjunction with a clutch assembly (or other vehicular control pedal assembly) that significantly reduces clutch pedal apply forces, that is relatively inexpensive to implement, that is reliable, and that exhibits substantially zero lag between driver actuation of the clutch pedal and generation of the assist force. It would be desirable if embodiments of such an unpowered pedal assist device were amenable to aftermarket installation on existing vehicles. It would further be desirable if such an assist device would initially bias the clutch pedal toward the non-depressed position to ensure that, after being depressed, the clutch pedal returns to the non-depressed or upright position to minimize wear between clutch assembly components. Finally, it would be desirable to provide embodiments of a clutch assembly including such an unpowered pedal assist device. Other desirable features and characteristics of the present invention will become apparent from the subsequent Detailed Description and the appended Claims, taken in conjunction with the accompanying Drawings and this Background.

BRIEF SUMMARY

Embodiments of an unpowered pedal assist device are provided for use in conjunction with a vehicular control pedal movable between a non-depressed position and a depressed position. In one embodiment, the unpowered pedal assist device includes a multi-bar linkage and at least one resilient element coupled to the multi-bar linkage. The multi-bar linkage is configured to be coupled to the vehicular control pedal and, when so coupled, to move from a start position to a finish position as the vehicular control pedal moves from the non-depressed position to the depressed position. The at least one resilient element is configured to bias the multi-bar linkage: (i) toward the start position over an initial range of travel of the vehicular control pedal, and (ii) toward the finish position over a primary range of travel of the vehicular control pedal.

Embodiments of a vehicular clutch assembly are also provided. In one embodiment, the vehicular clutch assembly includes an unpowered pedal assist device and a clutch pedal movable between a non-depressed position and a depressed position. The unpowered pedal assist device includes a four bar linkage and at least one resilient element coupled to the four bar linkage. The four bar linkage is mechanically linked to the clutch pedal and configured to move in conjunction therewith between a start position and a finish position corresponding to the non-depressed position and the depressed position, respectively. The at least one resilient element biases the four bar linkage: (i) toward the start position over an initial range of travel of the clutch pedal to bias the clutch pedal toward the non-depressed position, and (ii) toward the finish position over a primary range of travel of the clutch pedal to bias the clutch pedal toward the depressed position.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. Although primarily described below in the context of a vehicular clutch assembly, it is emphasized that embodiments of the unpowered pedal assist device are suitable for use in conjunction with other types of vehicular control pedal assemblies including, for example, brake pedal assemblies. As appearing herein, the phrase "resilient element" is utilized to indicate a structural element or assemblage of structural elements, such as a spring or an elastic band, that is inherently biased to return to an original position or state when deformed or otherwise displaced from the original position or state.

Figure 1:
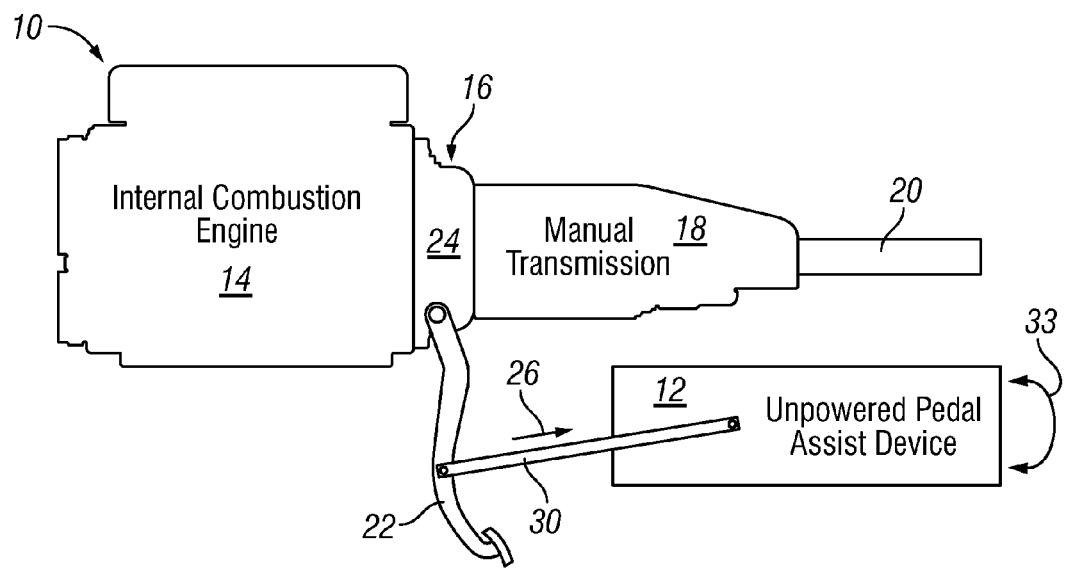
FIGS. 1 and 2 are functional diagrams of an unpowered pedal assist device and a vehicular powertrain including a clutch pedal in non-depressed and depressed positions, respectively, in accordance with an exemplary embodiment.
Figure 2:
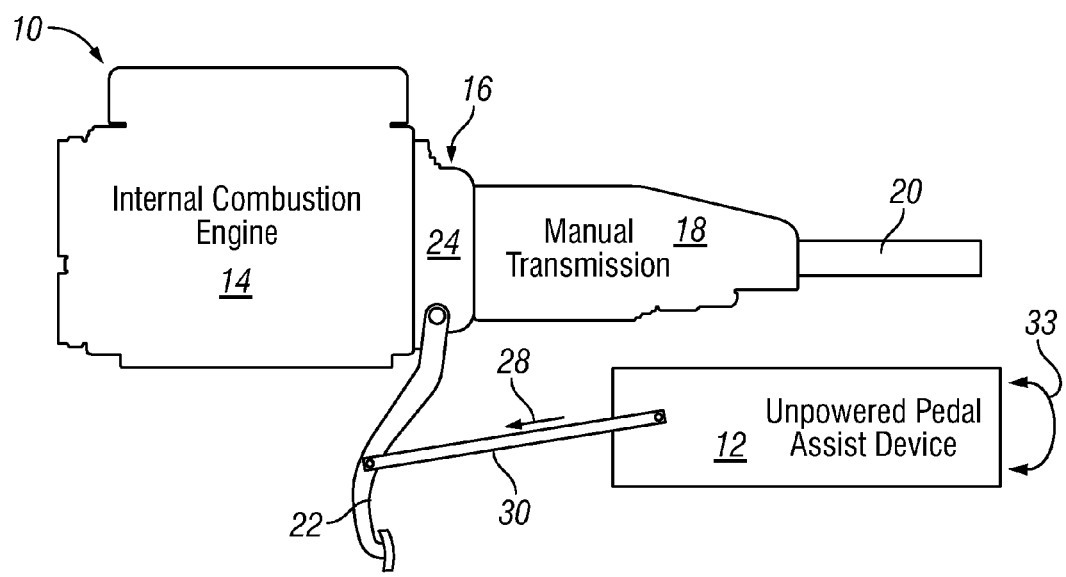

FIGS. 1 and 2 are functional diagrams of a vehicular powertrain 10 (partially shown) and an unpowered pedal assist device 12 in accordance with an exemplary embodiment. Powertrain 10 includes an internal combustion engine 14, a clutch assembly 16, and a manual transmission 18 having an output shaft 20. Clutch assembly 16 includes a clutch pedal 22 (e.g., a lever arm and a foot plate), a clutch housing 24, and various additional components (e.g., a clutch disc, a pressure plate, a diaphragm spring, a thrust bearing, etc.) that are well-known within the automotive industry and not shown in FIGS. 1 and 2 for clarity. In the simplified example illustrated in FIGS. 1 and 2, clutch pedal 22 is mounted directly to clutch housing 24; however, in actual implementations of clutch assembly 16, one or more intervening structural elements (e.g., one or more additional levers and/or a hydraulic system) will typically be connected between clutch pedal 22 and clutch housing 24. As depicted in FIG. 1, clutch pedal 22 normally resides in an upright or non-depressed position, which corresponds to the engaged position of clutch assembly 16. As indicated in FIG. 2, clutch pedal 22 can be depressed by a driver to rotate clutch pedal 22 into a depressed position, disengage clutch assembly 16, and permit a driver to change the gear ratio of manual transmission 18.

A driver will typically use his or her foot to depress clutch pedal 22 and move clutch pedal 22 from the non-depressed position shown in FIG. 1 toward the fully depressed position shown in FIG. 2. However, in certain cases, such as when a disabled driver lacks full usage of his or her legs or feet, a driver may move clutch pedal from the non-depressed position to the depressed position utilizing a different manual control, such as a hand-actuated lever mounted near the vehicle's steering wheel. For at least this reason, the term "pedal," the phrase "clutch pedal," the phrase "vehicular control pedal," and like terms and phrases are utilized herein in a broad sense to encompass any manually-actuated control (e.g., a clutch pedal, a hand-actuated lever deployed aboard a passenger vehicle, a hand-actuated lever deployed aboard a motorcycle, etc.) that can be utilized by a driver selectively disengage a vehicular clutch assembly, such as clutch assembly 16 shown in FIGS. 1 and 2. In addition, embodiments of unpowered pedal assist device 12 can also be utilized in conjunction with other types of vehicular control pedals, such as brake pedals. Thus, as appearing herein, the phrase "unpowered pedal assist device" and similar phrases are utilized to denote embodiments of a device that assists a driver in the actuation of a clutch pedal, a brake pedal, or any other vehicular control pedal as previously defined.

To transmit the force output of unpowered pedal assist device 12 to vehicular clutch assembly 16, device 12 is conveniently mechanically linked to clutch assembly 16 by one or more rigid links. For example, as shown in FIGS. 1 and 2, unpowered pedal assist device 12 may be mechanically connected to clutch assembly 16 by a force apply rod 30, which is pivotally coupled between an output member of unpowered pedal assist device 12 (e.g., grounded link 44 described below in conjunction with FIGS. 3-5) and the lever of clutch pedal 22. This example notwithstanding, unpowered pedal assist device 12 can be mechanically linked to clutch pedal 22, or any other component of clutch assembly 16, utilizing any number and type of intervening structural elements that cooperate to effectively transmit the force assist output of unpowered pedal assist device 12 to clutch assembly 16. In addition, unpowered pedal assist device 12 can be mounted in any desired orientation in three dimensional space. For example, in one specific embodiment, unpowered pedal assist device 12 can be transversely mounted under a vehicle's dashboard and mechanically linked to clutch pedal 22 utilizing a bell crank assembly.

In the exemplary embodiment illustrated in FIGS. 1 and 2, and in contrast to certain other pedal assist devices, unpowered pedal assist device 12 is not integrated into clutch assembly 16; e.g., the four bar linkage described below and included within assist device 12 is structurally separate and remotely located from clutch pedal 22. A vehicle can thus be equipped with unpowered pedal assist device 12 during original manufacture or, instead, subsequently equipped with assist device 12 via aftermarket installation. In this latter case, unpowered pedal assist device 12 can be mounted at least partially beneath the driver's seat and connected to clutch pedal 22 utilizing an elongated rigid link, such as force apply rod 30 shown in FIGS. 1 and 2. Notably, the force output profile of unpowered pedal assist device 12 can be customized to complement the resistance characteristics of the clutch assembly included within a particular vehicle and/or to accord with driver preferences. The force output profile of unpowered pedal assist device 12 can be adjusted by altering the angle at which unpowered pedal assist device 12 is connected to clutch pedal 22 (indicated in FIGS. 1 and 2 by double-headed arrow 33) and/or by altering various structural parameters of assist device 12 (e.g., spring constants, lever lengths, location of pivot joints, etc.), as described more fully below.

Figure 3:
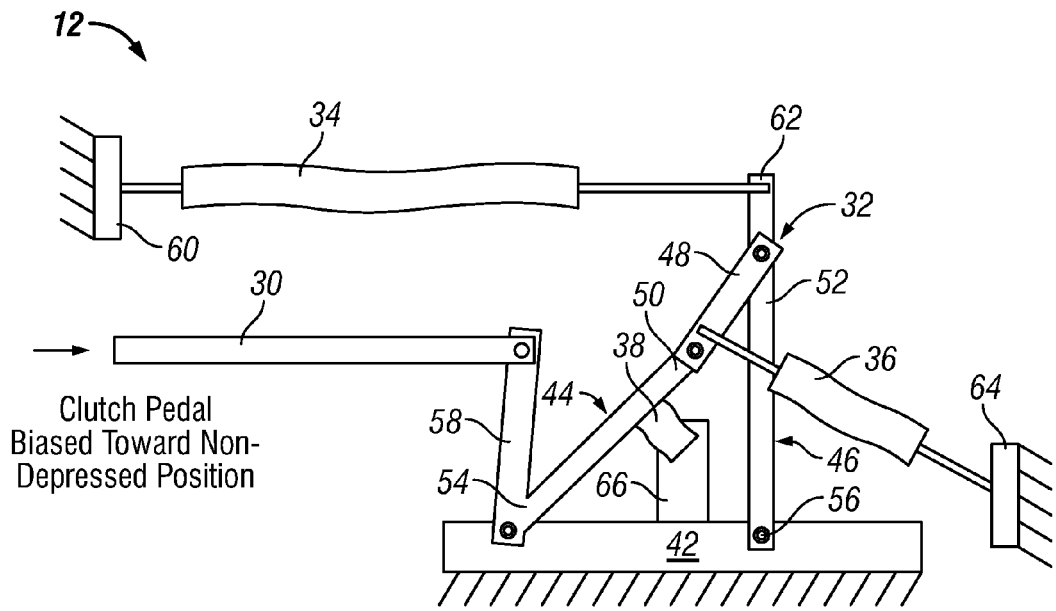
FIGS. 3, 4, and 5 are generalized plan views of the unpowered pedal assist device shown in FIGS. 1 and 2 and including a four bar linkage in start, intermediate or over-center, and finish positions, respectively, in accordance with an exemplary embodiment.
Figure 4:
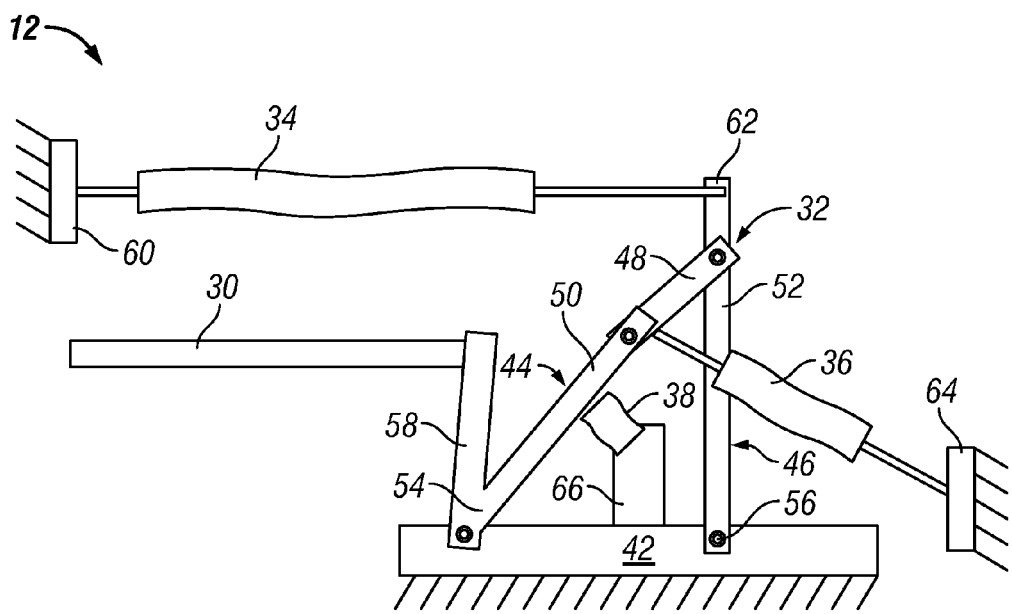
Figure 5:
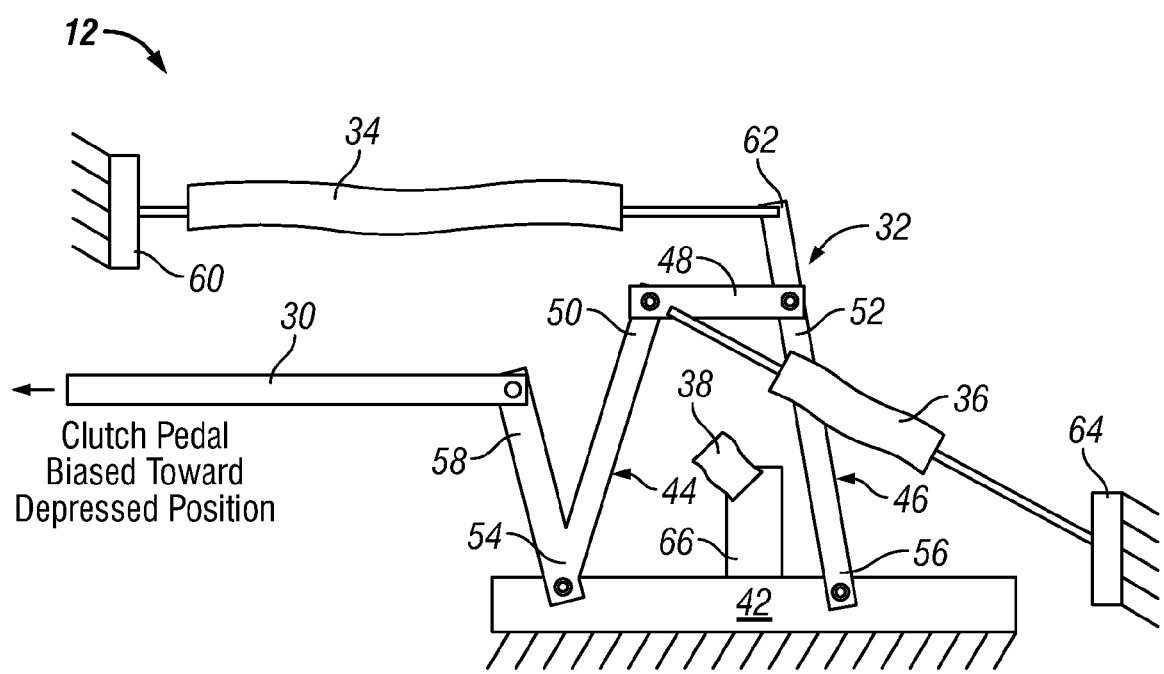

FIGS. 3-5 are plan views of unpowered pedal assist device 12 including a four bar linkage 32 and a plurality of resilient elements 34, 36, 38 in accordance with an exemplary implementation of assist device 12. Four bar linkage 32 is movable from a start position (shown in FIG. 3), through an intermediate or "over-center" position (shown in FIG. 4), and to a finish position (shown in FIG. 5). As indicated above, and as described more fully below, four bar linkage 32 is mechanically linked to clutch pedal 22 by force apply rod 30 when unpowered pedal assist device 12 is installed within a vehicle. When four bar linkage 32 is mechanically linked to clutch pedal 22 in this manner, the start position (FIG. 3) and the finish position (FIG. 5) of four bar linkage 32 correspond to the non-depressed position (FIG. 1) and the fully depressed position (FIG. 2) of clutch pedal 22, respectively. Thus, as clutch pedal 22 normally resides in the non-depressed position (FIG. 1), four bar linkage 32 will normally reside in the start position (FIG. 3); and movement of clutch pedal 22 into the fully depressed position (FIG. 2) will result in corresponding movement of four bar linkage 32 into the finish position (FIG. 5).

Four bar linkage 32 includes a frame link 42 (also commonly referred to as a "fixed link" or a "ground link"), a first grounded link 44, a second grounded link 46, and a coupler link 48. Coupler link 48 is pivotally coupled between an upper end portion 50 of first grounded link 44 and an intermediate portion 52 of second grounded link 46. The lower end portion 54 of first grounded link 44 is, in turn, pivotally coupled to frame link 42 at a first location; and the lower end portion 56 of second grounded link 46 is pivotally coupled to frame link 42 at a second location longitudinally spaced from the first location. Finally, first grounded link 44 is pivotally coupled to a first end of force apply rod 30, the opposing end of which is coupled to the lever arm of clutch pedal 22 (FIGS. 1 and 2) as previously described. Notably, in the exemplary embodiment illustrated in FIGS. 3-5, force apply rod 30 is not directly connected to the main body of first grounded link 44; instead, force apply rod 30 is connected to an output arm 58 of first grounded link 44, which is rigidly joined to and angularly offset from the main body of grounded link 44 throughout the range of motion of grounded link 44. Output arm 58 changes the ratio of mechanical advantage of four bar linkage 32 over its initial range of motion to the mechanical advantage at the end of the range of motion toward the finish position and, therefore, adjusts the rate at which the assist force builds early in travel and the rate of force decay after peak assist force is created by the unpowered pedal assist device 12. The angle between the main body of grounded link 44 and output arm 58 can be increased or decreased, as desired, to adjust the force assist profile of unpowered pedal assist device 12 to accord with driver preferences and/or to complement the resistance characteristics of a particular clutch assembly. The foregoing notwithstanding, grounded link 44 may not include an output arm in alternative embodiments, and force apply rod 30 may be pivotally joined directly to the main body of grounded link 44 (e.g., to a central portion of grounded link 44).

In the exemplary embodiment illustrated in FIGS. 3-5, resilient elements 34, 36, 38 include a main spring 34, a return spring 36, and a soft stop spring 38. Main spring 34 assumes the form of a helical extension spring, which is coupled between a generalized static mounting structure 60 and an upper end portion 62 of grounded link 46. During operation of assist device 12, main spring 34 biases grounded link 46 to rotate in a first rotational direction (counterclockwise in the illustrated orientation). Return spring 36 likewise assumes the form of a helical extension spring, which is coupled between a generalized static mounting structure 64 and an intermediate portion of coupler link 48. During operation of assist device 12, return spring 36 biases coupler link 48 to rotate in the first rotational direction. Finally, soft stop spring 38 assumes the form of a helical compression spring, which is mounted to a mounting structure 66 projecting from frame link 42 and positioned to be compressed by grounded link 44 when four bar linkage 32 is in the start position (FIG. 3). Thus, in the start position (FIG. 3), four bar linkage 32 biases grounded link 44 to rotate in the first rotational direction and, more generally, biases four bar linkage 32 toward the over-center position (FIG. 4). The foregoing notwithstanding, the manner in which springs 34, 36, and 38 are interconnected with four bar linkage 32 will inevitably vary amongst different embodiments; e.g., return spring 36 may be connected to grounded link 44 in alternative embodiments and/or soft stop spring 38 may be positioned to be compressed by coupler link 48 in the start position (FIG. 3). In further embodiments, one or more of springs 34, 36, and 38 may be omitted or replaced by a different type of resilient element; e.g., in alternative embodiments, main spring 34 and/or return spring 36 may be replaced by an elastic band or by a torsion spring disposed around a pivot joint of linkage 32.

Static mounting structures 60 and 64 will typically remain stationary during operation of unpowered pedal assist device 12, although the possibility that structures 60 and 64 may be repositioned by a driver or a technician when assist device 12 is not in use is by no means precluded. Static mounting structures 60 and 64 may assume the form of a base member or any other structural member that is rigidly mounted to the vehicle chassis, the driver's seat, the vehicle's dashboard, the passenger compartment floor, or the like. Fixed link 42 will likewise remain stationary as four bar linkage 32 moves between start (FIG. 3) and finish (FIG. 5) position and, more specifically, as links 44, 46, and 48 change relative orientation from a first orientation (i.e., the orientation shown in FIG. 3) to a second orientation (i.e., the orientation shown in FIG. 5). The relative spatial positioning of fixed link 42, static mounting structure 60, and static mounting structure 64 will thus typically remain fixed during normal operation of unpowered pedal assist device 12.

When four bar linkage 32 moves into the over-center position shown in FIG. 4, grounded link 44 and coupler link 48 rotate into linear alignment (i.e., the longitudinal axes of links 44 and 48 become parallel) and effectively act as a brace between grounded link 46 and frame link 42. Consequently, when four bar linkage 32 is in the over-center position (FIG. 4), main spring 34 exerts little to no bias force on four bar linkage 32. In all other positions, main spring 34 biases four bar linkage 32 toward either the start position (FIG. 3) or the finish position (FIG. 5). In particular, when four bar linkage 32 is between the start position (FIG. 3) and the over-center position (FIG. 4), main spring 34 biases four bar linkage 32 toward the start position (FIG. 3), and force apply rod 30 exerts a pulling force on clutch pedal 22 biasing pedal 22 toward the non-depressed position (indicated in FIG. 1 by arrow 26). Conversely, when four bar linkage 32 is between the over-center position (FIG. 4) and the finish position (FIG. 5), main spring 34 biases four bar linkage 32 toward the finish position (FIG. 5), and force apply rod 30 exerts a pushing force on clutch pedal 22 biasing pedal 22 toward the fully depressed position (indicated in FIG. 2 by arrow 28). Return spring 36, by comparison, biases four bar linkage 32 toward the start position (FIG. 3) throughout the range of motion of linkage 32. Consequently, after four bar linkage 32 has moved into the finish position (FIG. 5), return spring 36 helps to return four bar linkage 32 to the start position (FIG. 3) and to prevent a lock-out condition as four bar linkage 32 rotates through the over-center position (FIG. 4). As a result of the above-described structural arrangement, unpowered pedal assist device 12 provides a unique, bi-directional force assist output profile over the range of travel of clutch pedal 22, as described more fully below in conjunction with FIG. 6.

Figure 6:
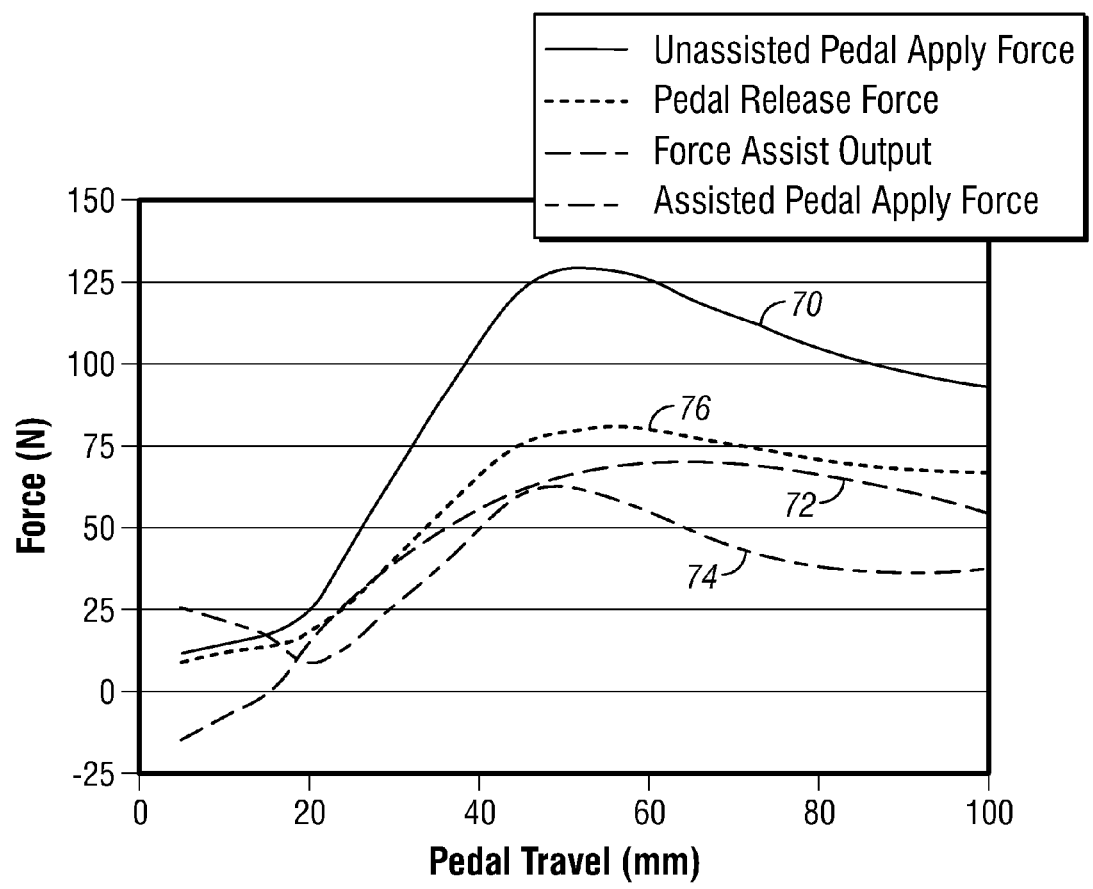
FIG. 6 is a graph of pedal travel (horizontal axis) versus force (vertical axis) expressing, in part, the pedal apply force required to depress the clutch pedal shown in FIGS. 1 and 2 without assistance from the unpowered pedal assist device shown in FIGS. 1-5 and the pedal apply force required to depress the clutch pedal shown in FIGS. 1 and 2 with assistance from the unpowered pedal assist device shown in FIGS. 1-5.

FIG. 6 is a graph of pedal travel (horizontal axis) versus force (vertical axis) illustrating: (i) the pedal apply forces required to depress exemplary clutch pedal 22 (FIGS. 1 and 2) when unpowered pedal assist device 12 is not coupled to clutch pedal 22 (referred to herein as the "unassisted pedal apply force profile" and shown in FIG. 6 at 70), (ii) the force assist output profile generated by unpowered pedal assist device 12 over the range of travel of exemplary clutch pedal 22 (shown in FIG. 6 at 72), and (iii) the pedal apply force required to depress clutch pedal 22 when assist device 12 is coupled thereto (referred to herein as the "assisted pedal apply force profile" and shown in FIG. 6 at 74). In addition, FIG. 6 graphically expresses the pedal release force profile of clutch pedal 22; i.e., the maximum force that can be applied to clutch pedal 22 and still allow pedal 22 to return to the non-depressed position (FIG. 1) after being depressed (shown in FIG. 6 at 76). The force profiles and values graphically illustrated in FIG. 6 and described below are, of course, provided by way of non-limiting examples only and will vary amongst different embodiments of unpowered pedal assist device 12 and clutch assembly 16.

In the exemplary embodiment illustrated in FIG. 6, unassisted pedal apply force profile 70 has a relatively gentle slope over an initial range of travel of clutch pedal 22 (e.g., approximately 0-20 millimeters). During this initial range of travel, which is commonly referred to as the "pedal free play zone," the thrust bearing of clutch assembly 16 moves toward, but does not engage the diaphragm spring. Next, over a second range of travel (e.g., approximately 20-55 millimeters), unassisted pedal apply force profile 70 has a relatively steep slope, which generally corresponds to the deflection of the diaphragm spring and the disengagement of clutch assembly 16. At the end of the second range of travel, unassisted pedal apply force profile 70 peaks in magnitude (referred to here as the "unassisted peak apply force") as clutch assembly 16 moves into a fully disengaged position. In the illustrated example, the unassisted peak apply force of clutch pedal 22 is approximately 130 Newton. Lastly, over a final range of travel (e.g., approximately 55-100 millimeters), unassisted pedal apply force profile 70 has a gradual, negative slope, which generally corresponds to further deflection of the diaphragm spring after disengagement of clutch assembly 16.

As shown in FIG. 6, the exemplary force assist output profile 72 of unpowered pedal assist device 12 is negative over an initial range of travel of clutch pedal 22 (e.g., approximately 0-20 millimeters). More specifically, the assist force provided by unpowered pedal assist device 12 is approximately −20 Newton when clutch pedal 22 is initially displaced from the non-depressed position (FIG. 1) and increases relatively rapidly to approximately 0 Newton after pedal 22 has traveled approximately 20 millimeters. When coupled to clutch pedal 22, assist device 12 thus biases clutch pedal 22 toward the non-depressed position (FIG. 1) over the initial range of travel. In this manner, unpowered pedal assist device 12 helps to ensure that, when clutch assembly 16 is in the engaged position (FIG. 1), frictional wear of the internal components of clutch assembly 16 (e.g., the thrust bearing and the diaphragm plate) is minimized or eliminated. Furthermore, by rapidly reducing the negative assist force to zero over the initial range of motion of clutch pedal 22, and specifically over the pedal free play zone, unpowered pedal assist device 12 only marginally increases the driver effort required to initially depress clutch pedal 22.

Exemplary force assist output profile 72 of unpowered pedal assist device 12 is positive over the remaining range of travel of clutch pedal 22 (referred to herein as the pedal's "primary range of travel"; approximately 20-100 millimeters in the illustrated example). More specifically, force assist output profile 72 is slightly greater than approximately 0 Newton after pedal 22 has traveled approximately 20 millimeters, increases to a peak assist force of approximately 70 Newton after pedal 22 has traveled approximately 65 millimeters, and then gradually decreases to approximately 55 Newton after pedal 22 has traveled approximately 100 millimeters. Unpowered pedal assist device 12 thus provides a force assist output profile having a first average slope over an initial range of travel of clutch pedal 22 (e.g., approximately 0-70 millimeters in the illustrated example) and having a second average slope, which is negative and less than the first average slope, over a subsequent range of travel of clutch pedal 22 (e.g., approximately 70-100 millimeter in the illustrated example).

Considering force assist output profile 72 shown in FIG. 6, it should be appreciated that, when coupled to clutch pedal 22, unpowered pedal assist device 12 significantly reduces the force required by a driver to depress clutch pedal 22 over its primary range of travel (e.g., approximately 20-100 millimeters). This may be more fully appreciated by comparing unassisted pedal apply force profile 70 of clutch pedal 22 to assisted pedal apply force profile 74, as further shown in FIG. 6. As can be seen, when coupled to clutch pedal 22, unpowered pedal assist device 12 reduces the peak apply force required by a driver to further depress clutch pedal 22 by more than half, from approximately 130 Newton to approximately 55 Newton. In addition, force assist output profile 72 does not surpass pedal force release profile 76 of clutch pedal 22 over the range of travel of pedal 22; consequently, assist device 12 will not interfere with the normal return of clutch pedal 22 to the non-depressed position (FIG. 1) when the driver-applied force is removed.

The foregoing has thus provided at least one exemplary embodiment of an unpowered pedal assist device for use in conjunction with a vehicular clutch assembly (or other vehicular control pedal assembly) that significantly reduces the force required by a driver to depress a clutch pedal (or other control pedal) to increase driver comfort, especially in the context of high performance or high horsepower platforms. Notably, the above-described exemplary assist device initially biases the clutch pedal toward the non-depressed position to ensure that, after being depressed, the clutch pedal returns to the non-depressed or upright position to minimize wear between clutch assembly components. In addition, the above-described exemplary assist device is relatively inexpensive to implement, reliable, and exhibits substantially zero lag between driver actuation of the clutch pedal and generation of the assist force. Furthermore, in the above-described exemplary embodiment, the unpowered pedal assist device is not directly integrated into the vehicular clutch assembly (e.g., four bar linkage 32 is formed independently of and remotely located from clutch pedal 22, as shown in FIGS. 1-5); consequently, the above-described assist device is well-suited for aftermarket installation on existing vehicles. Although, in the foregoing example, the unpowered pedal assist device employed a four bar linkage, the unpowered pedal assist device may include other types of movable linkages having a different number of links (e.g., five or more links) in further embodiments. For this reason, the phrase "multi-bar linkage" may be utilized herein to encompass movable linkages including three or more bar links capable of moving between a start position and a finish position to produce a force assist output profile as previously described.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims. Furthermore, as appearing in the appended Claims, the term "connected" is utilized in a relative sense to indicate that a first named element is more directly coupled to a second named element than to any other structural element recited in a given claim and in any claims from which the given claim depends. The term "connected," then, does not preclude the possibility of intervening structural elements. For example, in the context of claim that positively recites the features of link A, link B, and link C, the statement "link A is connected to link B" indicates that link A is coupled more directly to link B than to link C.

What is claimed is:

1. A vehicular clutch assembly, comprising:
   a clutch pedal movable between a non-depressed position and a depressed position; and
   an unpowered pedal assist device, comprising:
      a four bar linkage mechanically linked to the clutch pedal and configured to move in conjunction therewith between a start position and a finish position corresponding to the non-depressed position and the depressed position, respectively;
      a main spring coupled to the four bar linkage and biasing the four bar linkage: (i) toward the start position over an initial range of travel of the clutch pedal to bias the clutch pedal toward the non-depressed position, and (ii) toward the finish position over a primary range of travel of the clutch pedal to bias the clutch pedal toward the depressed position; and
      a return spring coupled to the four bar linkage and configured to bias the four bar linkage toward the start position over the initial range of travel and over the primary range of travel of the vehicular control pedal.

2. A vehicular clutch assembly according to claim 1 wherein the four bar linkage comprises a grounded link, and wherein the vehicular clutch assembly further comprises a force apply rod coupled between the grounded link and the clutch pedal.

3. A vehicular clutch assembly according to claim 2 wherein the four bar linkage is structurally separate and remotely located from the four bar linkage and is connected thereto by the force apply rod.

4. An unpowered pedal assist device for use in conjunction with a vehicular control pedal movable between a non-depressed position and a depressed position, the unpowered pedal assist device comprising:
   a four bar linkage configured to be coupled to the vehicular control pedal and, when so coupled, to move from a start position, through an over-center position, and to a finish position as the vehicular control pedal moves from the non-depressed position to the depressed position, the four bar linkage comprising:
      a frame link;
      a first grounded link pivotally coupled to the frame link;
      a second grounded link; and
      a coupler link pivotally coupled between the first grounded link and the second grounded link; and
   at least one resilient element coupled to the four bar linkage and configured to bias the four bar linkage: (i) toward the start position when the four bar linkage resides between the over-center position and the start position to bias the vehicular control pedal toward the non-depressed position, and (ii) toward the finish position when the four bar linkage resides between the over-center position and the finish position to bias the vehicular control pedal toward the depressed position;
   wherein the at least one resilient element comprises:
      a main spring, the second grounded link coupled between the frame link and the main spring; and
      a return spring coupled to one of the group consisting of the coupler link and the first grounded link, the return spring biasing the four bar linkage toward the start position.

5. An unpowered pedal assist device according to claim 4 further comprising a force apply rod having a first end portion pivotally coupled to the first grounded link and having a second end portion configured to be coupled to the vehicular control pedal.

6. An unpowered pedal assist device for use in conjunction with a vehicular control pedal movable between a non-depressed position and a depressed position, the unpowered pedal assist device comprising:
   a multi-bar linkage configured to be coupled to the vehicular control pedal and, when so coupled, to move from a start position to a finish position as the vehicular control pedal moves from the non-depressed position to the depressed position, the multi-bar linkage comprising:
      a frame link;
      first and second grounded links each pivotally coupled to the frame link; and
      a coupler link pivotally coupled between the first and second grounded links;
   at least one resilient element coupled to the multi-bar linkage and configured to bias the multi-bar linkage: (i) toward the start position over an initial range of travel of the vehicular control pedal, and (ii) toward the finish position over a primary range of travel of the vehicular control pedal; and
   a force apply rod having a first end portion coupled to the first grounded link and having a second end portion configured to be coupled to the vehicular control pedal.

7. An unpowered pedal assist device according to claim 6 wherein the first grounded link comprises:
   a main body pivotally coupled between the frame link and the coupler link; and
   an output arm angularly offset from the main body and coupled to the force apply rod.

8. An unpowered pedal assist device according to claim 6 wherein the at least one resilient element comprises a soft stop spring positioned to be compressed by one of the group consisting of the first grounded link and the coupler link when the multi-bar linkage is in the start position.

9. An unpowered pedal assist device according to claim 6 wherein the unpowered pedal assist device provides a force assist output profile having a first average slope over an initial range of travel of the vehicular control pedal and having a second average slope less than the first average slope over a subsequent range of travel of the vehicular control pedal.

10. An unpowered pedal assist device according to claim 9 wherein the second slope is negative.

11. An unpowered pedal assist device according to claim 6, wherein the multi-bar linkage is further movable through an over-center position wherein the coupler link and the first grounded link are linearly aligned.

12. An unpowered pedal assist device according to claim 11 wherein the at least one resilient element comprises a main spring coupled to the multi-bar linkage, the main spring biasing the multi-bar linkage: (i) toward the start position when the multi-bar linkage is between the over-center position and the start position, and (ii) toward the finish position when the multi-bar linkage is between the over-center position and the finish position.

13. An unpowered pedal assist device according to claim 12 wherein the main spring is connected to the second grounded link.

14. An unpowered pedal assist device according to claim 13 wherein the second grounded link comprises:
   a first end portion connected to the main spring;
   a second, opposing end portion pivotally coupled to the frame link; and
   an intermediate portion pivotally coupled to the coupler link.

15. An unpowered pedal assist device according to claim 13 wherein the second grounded link rotates in a first rotational direction as the multi-bar linkage moves from the start position to the finish position, and wherein the main spring biases the second grounded link to rotate in the first rotational direction.

16. An unpowered pedal assist device according to claim 12 wherein the at least one resilient element further comprises a return spring coupled to the multi-bar linkage and biasing the multi-bar linkage toward the start position.

17. An unpowered pedal assist device according to claim 16 wherein the return spring is connected to one of the group consisting of the coupler link and the first grounded link.

* * * * *